(No Model.)
J. D. CAY.
RAILROAD TRACK NUT LOCK.
No. 478,686. Patented July 12, 1892.
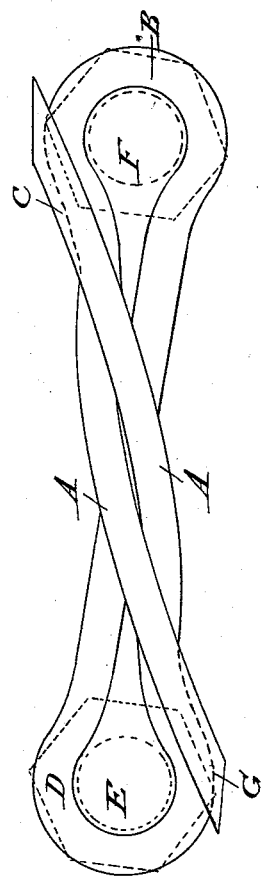

UNITED STATES PATENT OFFICE.

JOHN DAVID CAY, OF TALLAHASSEE, FLORIDA.

RAILROAD-TRACK NUT-LOCK.

SPECIFICATION forming part of Letters Patent No. 478,686, dated July 12, 1892.

Application filed November 21, 1891. Serial No. 412,692. (No model.)

*To all whom it may concern:*

Be it known that I, JOHN DAVID CAY, a citizen of the United States, residing at Tallahassee, in the county of Leon, State of Florida, have invented a new and useful Railroad-Track Nut-Lock, of which the following is a specification.

My invention relates to improvements in railroad-track nut-locks; and the objects of my improvements are, first, to provide a continuous pressure against the sides of the nuts by means of a spring, thereby retaining them in any desired position, and, second, to afford facilities for easily adjusting the nut-locks to the bolts, and as readily removing them when desired, without injury to any of their parts or damage to the bolts and nuts. I attain these objects by the mechanism illustrated in the accompanying drawing, which shows my nut-lock applied, and in which—

The letters E and F represent two bolts, the nuts of which are to be locked.

C and G are the ends of the springs of the nut-locks, which press against the sides of the nuts and lock them.

B and D are the nuts ready to be screwed down. As the nuts are pressed downward their corners come in contact with the round ends of the springs C and G, which ends are gradually pressed outward until they rest against the side of the nuts. The nuts are then securely locked.

My invention consists of a single piece of steel rod, round or flat, of adequate size, fashioned as follows: Two bolts E and F are placed any desired distance apart. The rod A is then passed under the bolt on the right hand and over that on the left, the center of the rod A being midway between the two bolts E and F. The ends of the rod are then drawn around the bolts, forming eyes or washers, and, continuing, pass each other at and across the middle of the rod, the ends of the rod resting against the bolts E and F. These ends of the springs C and G, being round, are forced outward by the corners of the nuts B and D as they are screwed down, and finally rest against the sides of the nuts, securely locking them.

I am aware that nut-locks have been made prior to my invention constructed of rod in the form of a coil having loops and projections. This, therefore, I do not claim.

What I do claim as my invention, and desire to secure by Letters Patent, is—

A nut-lock made of a single resilient rod A, passed around two bolts, forming a washer for the nuts thereon and crossing itself midway between the bolts, its ends pressing against the sides of the nuts and being backed up by the rod itself passing along beside and behind them and providing a continuous resilient pressure, by which the nuts are held firmly against unscrewing, substantially as disclosed.

JOHN DAVID CAY.

Witnesses:
B. F. VAN BRENT,
J. B. WHITFIELD.